United States Patent
Kim

(10) Patent No.: US 7,526,763 B2
(45) Date of Patent: Apr. 28, 2009

(54) METHOD FOR INITIALIZING INTERNET VIDEOPHONE TERMINAL

(75) Inventor: Nam-Hee Kim, Seoul (KR)

(73) Assignee: C&S Technology Co., Ltd., Seoul (KR)

( * ) Notice: Subject to any disclaimer, the term of this patent is extended or adjusted under 35 U.S.C. 154(b) by 994 days.

(21) Appl. No.: 10/947,944

(22) Filed: Sep. 23, 2004

(65) Prior Publication Data

US 2005/0076133 A1    Apr. 7, 2005

(30) Foreign Application Priority Data

Sep. 23, 2003    (KR) .................. 10-2003-0065774

(51) Int. Cl.
*G06F 9/44* (2006.01)
(52) U.S. Cl. ...................... 717/172; 715/744
(58) Field of Classification Search ................. 711/172; 709/221
See application file for complete search history.

(56) References Cited

U.S. PATENT DOCUMENTS 6,836,885 B1 * 12/2004 Buswell et al. .............. 717/172
2003/0074430 A1 * 4/2003 Gieseke et al. .............. 709/221

* cited by examiner

*Primary Examiner*—Fan Tsang
*Assistant Examiner*—Simon King
(74) *Attorney, Agent, or Firm*—Harness, Dickey & Pierce, PLC

(57) ABSTRACT

Disclosed is a method for initializing an Internet videophone terminal. In accordance with the method, the Internet videophone terminal is initialized using an initial configuration file therefor based on a specific data format, such that an initial setup process between a service provider and an Internet videophone terminal user can be simplified.

2 Claims, 3 Drawing Sheets

```
Initial Configuration File
# This is an example of the configuration file

# This file can be downloaded manually from within IAD Union IAD UI
    (Console, Web server, or Telnet)
# This file can also be downloaded automatically using BootP/DHCP client

#    Format of the Initial Configuration File
#      (1) The file must be in ASCII text format
#      (2) The file must start with the string "Initial Configuration File" at the
          1st line (case sensitive)
#      (3) A line started with a "#" or ";" symbol is a comment line
#      (4) Each line must be ended with "0x0D" or "0x0A" (Line-Feed or
          Carriage-Return)
#      (5) This file must be ended with an "0x00"
#      (6) All of the char (except the 1st line) must be in lower cases

# In this exmaple, this configuration file will configure the device to
# - access, 0:Static IP, 1:DHCP, 2:ADSL;If Ip_mode is 1 or 2, then ip or subnet
or gw is invalid.
# - setup the static IP address "172.16.3.233", subnet mask "255.255.240.0",
and default gateway is "172.16.0.254"

access=0
ip=172.16.3.233
subnet=255.255.240.0
gw=172.16.0.254 more commands are available and can be find with the "Command Line
Interface"

# end of configuration file
```

Initialization items: { access=0, ip=172.16.3.233, subnet=255.255.240.0, gw=172.16.0.254 }

FIG. 2

METHOD FOR INITIALIZING INTERNET VIDEOPHONE TERMINAL

BACKGROUND OF THE INVENTION

1. Field of the Invention

The present invention relates to a method for initializing an Internet videophone terminal, and more particularly to a method for initializing an Internet videophone terminal that can simplify an initial setup process between a service provider and an Internet videophone terminal user by initializing the Internet videophone terminal using an initial configuration file therefor based on a specific data format.

2. Description of the Related Art

Conventionally, because current initialization methods for Internet videophone terminals are performed using values preset in a program, it is difficult for service providers to cope with environments of various users. Moreover, because the users must additionally set a large number of items through a GUI (Graphical User Interface) or etc. appropriately to their own environments, it is inconvenient for the users to use the Internet videophone terminal.

SUMMARY OF THE INVENTION

Therefore, the present invention has been made in view of the above and other problems, and it is an object of the present invention to provide a method for initializing an Internet videophone terminal that can provide an initial setup process necessary for environments of various users to a service provider, and that can reduce the time required for an additional setup operation, performed by a user, other than the initial setup process, thus promoting the convenience of use of the Internet videophone terminal.

In accordance with an aspect of the present invention, the above and other objects can be accomplished by the provision of a method for initializing an Internet videophone terminal in an Internet videophone system including a DHCP (Dynamic Host Configuration Protocol) server, a TFTP (Trivial File Transfer Protocol) server, an SNMP (Simple Network Management Protocol) server and the Internet videophone terminal, comprising the steps of: storing an initial configuration file with initialization items for the Internet videophone terminal in a database of the SNMP server; by the Internet videophone terminal, sending a request for the initial configuration file to the SNMP server; by the SNMP server, retrieving the initial configuration file for the Internet videophone terminal from the database and sending the retrieved initial configuration file to the TFTP server; by the TFTP server, sending the initial configuration file received from the SNMP server to the Internet videophone terminal; and by the Internet videophone terminal, analyzing the initialization items contained within the initial configuration file received from the TFTP server, wherein the Internet videophone terminal is initialized according to the analyzed initialization items when restarted.

BRIEF DESCRIPTION OF THE DRAWINGS

The above and other objects, features and other advantages of the present invention will be more clearly understood from the following detailed description taken in conjunction with the accompanying drawings, in which:

FIG. 2 shows an example of an initial configuration file for the terminal used in the present invention.

DESCRIPTION OF THE PREFERRED EMBODIMENTS

The technical idea of the present invention is to provide convenience to users as well as service providers by initializing an Internet videophone terminal through an initial configuration file therefor in which initial values appropriate for an environment of each user are defined.

Now, preferred embodiments of the present invention will be described in detail with reference to the annexed drawings.

Figure 1:
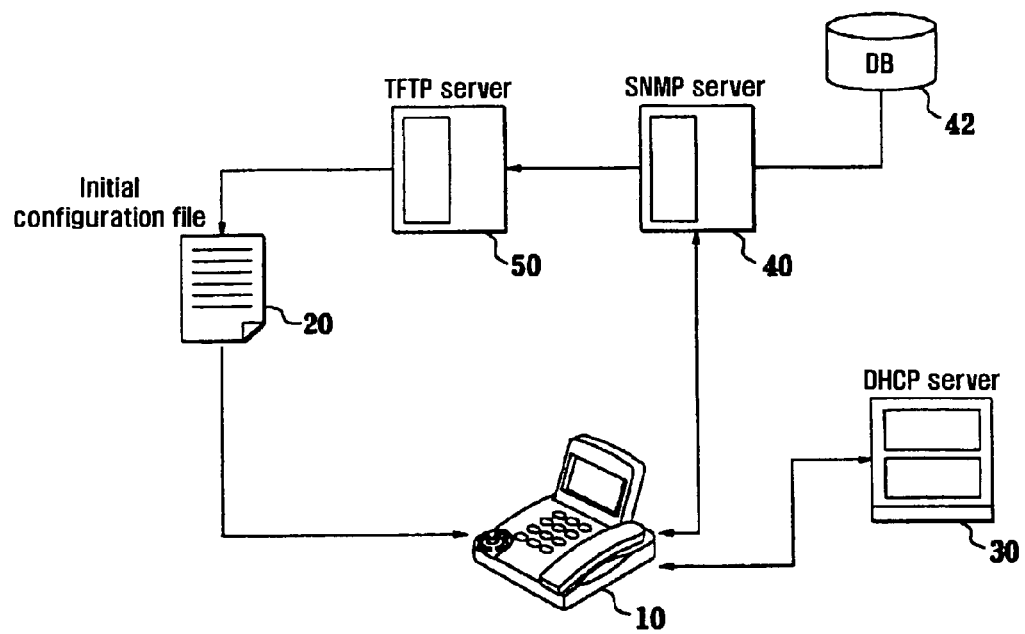
FIG. 1 shows the configuration of a system for initializing an Internet videophone terminal in accordance with one embodiment of the present invention.

FIG. 1 schematically shows the configuration of a system for initializing an Internet videophone terminal in accordance with one embodiment of the present invention. The system comprises the Internet videophone terminal 10, an initial configuration file 20 for use in the terminal 10, a DHCP (Dynamic Host Configuration Protocol) server 30, an SNMP (Simple Network Management Protocol) server 40, a database 42 storing the initial configuration file for the terminal and a TFTP (Trivial File Transfer Protocol) server 50.

The initial configuration file 20 defines initial values appropriate for an environment of a user. When the Internet videophone terminal 10 is initialized using the initial configuration file 20, the user does not need to perform an additional setup operation.

An example of the initial configuration file 20 used in the present invention is shown in FIG. 2. The following preconditions must be met.

(1) The initial configuration file must be in ASCII (American Standard Code for Information Interchange) text format.

(2) The file must start with the string "Initial Configuration File" at the $1^{st}$ line.

(3) A line started with a "#" or ";" symbol is a comment line.

(4) Each line must be ended with "0x0D" or "0x0A" (LF (Line-Feed) or CR (Carriage-Return)).

(5) The file must be ended with "0x00".

(6) All of the characters (except for the characters of the $1^{st}$ line) must be lower case.

(7) Items to be set in the terminal use a predetermined keyword, respectively.

(8) An initial value of a field is discriminated by a keyword and "=", and is represented by a string. For example, when Keyword1 and Keyword2 are specified, Keyword1=xxx and Keyword2=yyy.

(9) All margins " " and "\t" contained in a document are ignored.

The following Table 1 shows an example of initialization items, basic values and keywords that the Internet videophone terminal 10 takes into account. Here, the initialization items can be changed by negotiation between a service provider and the Internet videophone terminal, and can include items set by the user of the Internet videophone terminal. That is, the initialization items include all items capable of being preset on every terminal such as ring volume/type setup, automatic response setup and time server setup.

TABLE 1

| Item | | Details | Initial value | Size (byte) |
|---|---|---|---|---|
| Static IP | IP Address (ip) | Static IP address "123.456.789.111" (represented by a string) | NULL | 16 |
| | Subnet Mask (subnet) | Subnet mask (represented by a string) | NULL | 16 |
| | Gateway (gw) | Gateway address (represented by a string) | NULL | 16 |
| | DNS Address 1 (dns1) | DNS1 address (represented by a string) | NULL | 16 |
| DHCP | DNS Address 2 (dns2) | DNS2 address (represented by a string) | NULL | 16 |
| ADSL | ADSL ID (adsl_id) | User ID to be used for an ADSL connection (represented by a string) | "guest" | 50 |
| | ADSL Password (adsl_pw) | User password to be used for an ADSL connection (represented by a string) | "guest" | 20 |
| | PPPoE (pppoe) | Special authentication number to be used for a PPPoE connection (represented by a string) | NULL | 30 |

On the other hand, when the connection scheme of the Internet videophone terminal 10 is based on DHCP, the DHCP server 30 assigns IP (Internet Protocol) information necessary for an operation of the Internet videophone terminal 10, for example, an IP address, subnet mask, gateway address, DNS (Domain Name System) address, etc.

The SNMP server 40 is responsible for a function of remotely inspecting and controlling all operating states of the Internet videophone terminal 10. Moreover, the SNMP server 40 stores the initial configuration file 20 in the database 42, retrieves a corresponding initial configuration file from the database 42 according to a request of the Internet videophone terminal 10, and sends the retrieved initial configuration file to the TFTP server 50.

The TFTP server 50 serving as a kind of FTP (File Transfer Protocol) server stores a file for upgrading software and sends the stored file to the Internet videophone terminal 10 when the file is needed.

A method for initializing the Internet videophone terminal in accordance with one embodiment of the present invention in the system configured as described above will now be described in detail with reference to FIG. 3.

Figure 3:
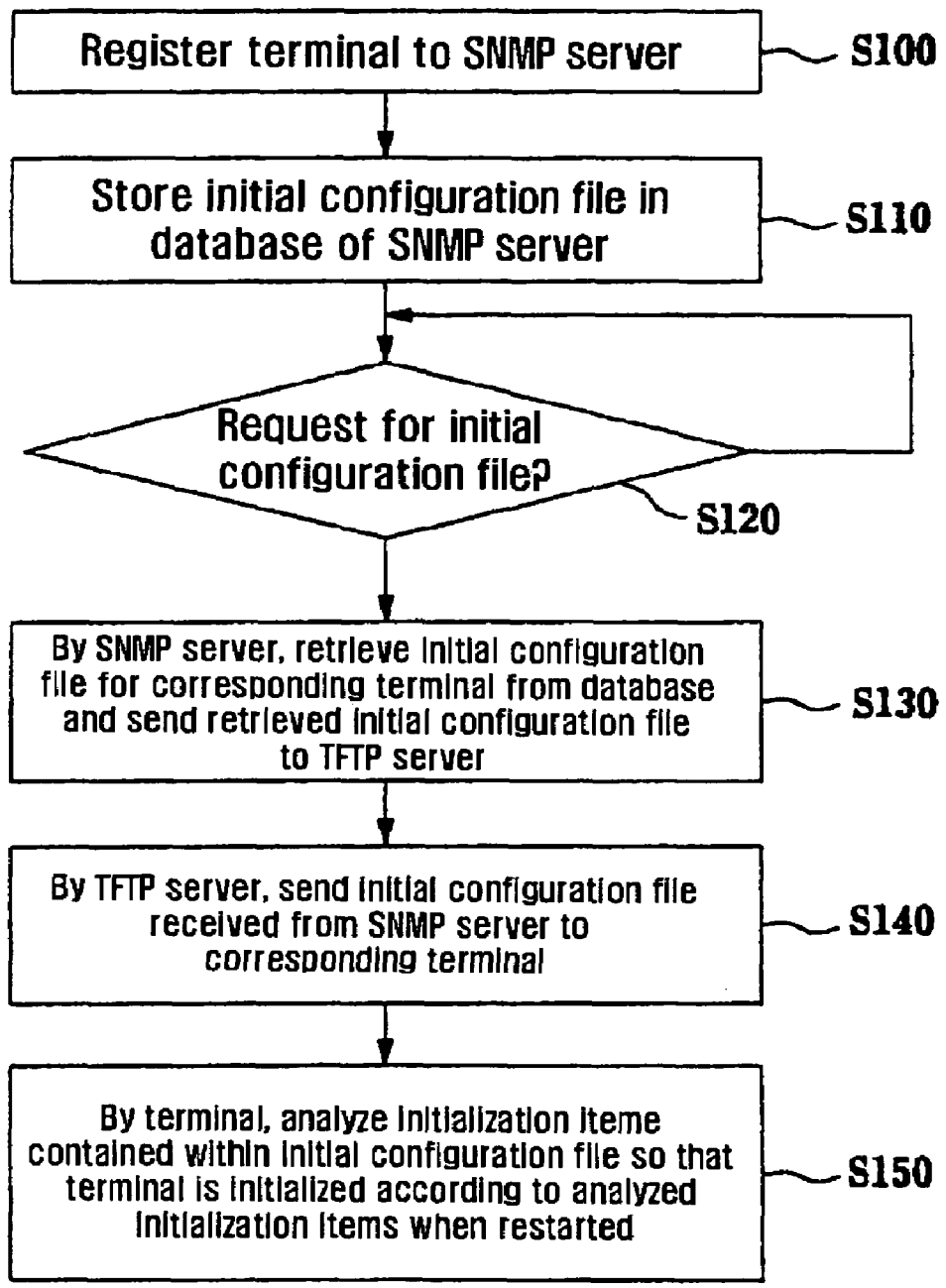
FIG. 3 is a flowchart illustrating a method for initializing the Internet videophone terminal in accordance with one embodiment of the present invention.

FIG. 3 is a flowchart illustrating the method for initializing the Internet videophone terminal in accordance with the present invention, and shows a process for initializing the Internet videophone terminal using an initial configuration file.

The user registers the Internet videophone terminal 10 to the SNMP server 40 (S100). At this point, the user provides information associated with his/her terminal use environment, for example, user setup information associated with a connection scheme based on ADSL (Asymmetric Digital Subscriber Line), a cable modem or etc., ring volume/type setup, automatic response setup, etc.

Initialization items of the initial configuration file 20 are decided on the basis of the user environment information acquired at the registration step S100, and are stored in the database 42 of the SNMP server 40 (S110).

When a connection scheme of the Internet videophone terminal 10 is based on DHCP, the initialization method can include the step of acquiring IP information from the DHCP server 30. Because this IP information acquisition step is well-known, its description will be omitted herein.

When the Internet videophone terminal 10 sends a request for a corresponding initial configuration file 20 to the SNMP server 40 (S120), the SNMP server 40 retrieves the corresponding initial configuration file 20 for the Internet videophone terminal 10 from the database 42 and then sends the corresponding initial configuration file 20 retrieved thereby to the TFTP server 50 (S130).

The TFTP server 50 sends, to the Internet videophone terminal 10, the initial configuration file 20 received from the SNMP server 40 (S140).

Finally, the Internet videophone terminal 10 analyzes the initialization items contained in the received initial configuration file 20 through a typical parsing process. Moreover, the Internet videophone terminal 10 is initialized according to the analyzed initialization items when restarted (S150).

For example, in case of the initial configuration file 20 shown in FIG. 2, values set in static IP items are called through the analysis process, and an IP address, a subnet mask, and a gateway address are set to "172.16.3.233", "255.255.240.0", and "172.16.0.254", respectively. Consequently, the Internet videophone terminal can be dynamically initialized through the initial configuration file.

As apparent from the above-described present invention, a setup process between a service provider and an Internet videophone terminal user can be more simplified. That is, the user can reduce malfunction due to an erroneous setup operation, and can simplify a complicated setup process. Because an initial configuration file based on a text format designates a setup process appropriate for each user environment, the service provider can simplify the setup process, thus reducing costs associated with the conventional complicated setup process. The present invention enables various service categories to be easily designated when an Internet telephony service providing various service categories is provided which is different from the conventional PSTN (Public Switched Telephone Network) telephony service.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for initializing an Internet videophone terminal in an Internet videophone system including a DHCP (Dynamic Host Configuration Protocol) server, a TFTP (Trivial File Transfer Protocol) server, an SNMP (Simple Network Management Protocol) server and the Internet videophone terminal, comprising the steps of:

registering the Internet videophone terminal to the SNMP server;

storing an initial configuration file of ASCII (American Standard Code for Information Interchange) text format with initialization items for the Internet videophone terminal in a database of the SNMP server;

by the Internet videophone terminal, sending a request for the initial configuration file to the SNMP server;

by the SNMP server, retrieving the initial configuration file for the Internet videophone terminal from the database and sending the retrieved initial configuration file to the TFTP server;

by the TFTP server, sending the initial configuration file received from the SNMP server to the Internet videophone terminal; and by the Internet videophone terminal, analyzing the initialization items contained within the initial configuration file received from the TFTP server, wherein the initialization items of the initial configuration file are decided based on use environment information acquired at the registration step, and the Internet videophone terminal is initialized according to the analyzed initialization items when restarted.

2. The method of claim 1, wherein the initialization items use predetermined keywords and include items capable of being preset on every Internet videophone terminal such as ring volume/type setup and automatic response setup.

* * * * *